United States Patent
Berger

(10) Patent No.: US 11,149,602 B2
(45) Date of Patent: Oct. 19, 2021

(54) PASSIVE FLAP VALVE FOR VEHICLE EXHAUST SYSTEM

(71) Applicant: Faurecia Emissions Control Technologies, USA, LLC, Columbus, IN (US)

(72) Inventor: Matthias Berger, Columbus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 622 days.

(21) Appl. No.: 15/985,901

(22) Filed: May 22, 2018

(65) Prior Publication Data
US 2019/0360373 A1 Nov. 28, 2019

(51) Int. Cl.
*F01N 1/16* (2006.01)
*F16K 1/18* (2006.01)

(52) U.S. Cl.
CPC .............. *F01N 1/163* (2013.01); *F01N 1/166* (2013.01); *F16K 1/18* (2013.01); *F01N 2240/36* (2013.01)

(58) Field of Classification Search
CPC . F01N 1/166; F01N 1/163; F01N 1/18; F01N 2240/36
USPC .......................................... 181/241, 254, 237
See application file for complete search history.

(56) References Cited

U.S. PATENT DOCUMENTS

| | | | |
|---|---|---|---|
| 4,161,996 A | 7/1979 | Dolejsi | |
| 4,484,659 A * | 11/1984 | Buchwalder | F01N 1/02 181/237 |
| 4,699,244 A | 10/1987 | Bergquist et al. | |
| 4,903,486 A * | 2/1990 | Finkle | F01N 1/165 181/236 |
| 6,065,564 A * | 5/2000 | Uegane | F01N 1/084 181/237 |
| 6,390,132 B1 | 5/2002 | Johnson et al. | |
| 6,637,449 B2 * | 10/2003 | Nagai | F01N 1/08 137/15.18 |
| 7,066,296 B2 * | 6/2006 | Uegane | F01N 1/084 137/855 |
| 7,240,768 B2 | 7/2007 | Sageman | |

(Continued)

FOREIGN PATENT DOCUMENTS

| | | |
|---|---|---|
| CN | 2861661 Y | 1/2007 |
| CN | 201280966 Y | 7/2009 |

(Continued)

OTHER PUBLICATIONS

First Examination Report for Indian Application No. 201914018761 dated Aug. 12, 2020.

(Continued)

*Primary Examiner* — Forrest M Phillips
(74) *Attorney, Agent, or Firm* — Carlson, Gaskey & Olds, P.C.

(57) ABSTRACT

A valve assembly for a vehicle exhaust system includes at least one pipe enclosing an exhaust gas flow path, the pipe defining a central axis, and at least one flexible flap positioned within the exhaust gas flowpath. The at least one flexible flap has one fixed edge held fixed to the pipe and extends to a distal edge that is free to bend in response to an increase in exhaust gas flow pressure to provide a variable restriction to flow through the pipe that varies in response to a pressure difference upstream and downstream of the at least one flexible flap.

22 Claims, 4 Drawing Sheets

(56) References Cited

U.S. PATENT DOCUMENTS

| | | | |
|---|---|---|---|
| 7,896,130 B2 * | 3/2011 | Hill | F01N 1/166 181/254 |
| 8,201,660 B2 * | 6/2012 | Han | F16K 15/031 181/254 |
| 8,636,103 B1 | 1/2014 | Won | |
| 9,695,719 B2 | 7/2017 | Arai | |
| 2002/0029807 A1 | 3/2002 | Nagai et al. | |
| 2004/0065503 A1 | 4/2004 | Uegane et al. | |
| 2004/0194457 A1 | 10/2004 | Hufendiek et al. | |
| 2005/0155816 A1 | 7/2005 | Alcini et al. | |
| 2005/0178612 A1 | 8/2005 | Nohl et al. | |
| 2007/0107981 A1 * | 5/2007 | Sicotte | F01N 1/22 181/237 |
| 2008/0223025 A1 * | 9/2008 | Hill | F01N 1/081 60/324 |
| 2009/0302252 A1 | 12/2009 | Cheung | |
| 2011/0303864 A1 * | 12/2011 | Lee | F01N 1/166 251/337 |
| 2014/0158462 A1 * | 6/2014 | Han | F01N 1/166 181/236 |
| 2015/0053500 A1 * | 2/2015 | Park | F01N 1/166 181/241 |
| 2017/0204756 A1 * | 7/2017 | Middleton, Jr. | F01N 13/08 |
| 2019/0360374 A1 * | 11/2019 | Thomas | F01N 1/163 |

FOREIGN PATENT DOCUMENTS

| | | | |
|---|---|---|---|
| CN | 201844073 U | 5/2011 | |
| CN | 202690169 U | 1/2013 | |
| CN | 103270261 A | 8/2013 | |
| CN | 104169608 A | 11/2014 | |
| CN | 105781680 A | 7/2016 | |
| CN | 105781681 A | 7/2016 | |
| DE | 2815887 A1 | 10/1978 | |
| EP | 3109423 A1 | 12/2016 | |
| EP | 3141720 A1 | 3/2017 | |
| FR | 2965296 A1 * | 3/2012 | F16K 15/031 |
| JP | S6196117 A | 5/1986 | |
| JP | H11315711 A | 11/1999 | |

OTHER PUBLICATIONS

Chinese Official Action dated Dec. 28, 2020 for Chinese Application No. 201910428535.1.

* cited by examiner

PASSIVE FLAP VALVE FOR VEHICLE EXHAUST SYSTEM

TECHNICAL FIELD

The subject invention relates to a passive flap valve that provides a variable restriction in a vehicle exhaust system.

BACKGROUND OF THE INVENTION

Exhaust systems are widely known and used with combustion engines. Typically, an exhaust system includes exhaust tubes or pipes that convey hot exhaust gases from the engine to other exhaust system components, such as catalysts, mufflers, resonators, etc. Exhaust components systems generate various forms of resonances, which result in undesirable noise. Spring/mass-like resonances occur at relatively low frequencies, e.g. below 100 Hz. This type of resonance occurs when the exhaust gas within a pipe acts as a mass and the exhaust gas in muffler volumes act as springs. The system also generates standing waves, which comprise acoustic resonances in the pipes themselves. These standing waves are most prevalent in the longest pipes of the system. The frequency of these standing waves is a function of pipe length. Typically, these standing waves occur above 100 Hz. Addressing these standing wave and spring/mass noise issues increases system cost and weight.

Powertrain technology is continually pushing the exhaust sound that needs to be attenuated to lower and lower frequencies. Noise reducing solutions traditionally have included increasing volume or utilizing valves. Mufflers and resonators include acoustic volumes that cancel out sound waves carried by the exhaust gases. Although effective, these components are often relatively large in size and provide limited nose attenuation. Valves have also been used to provide noise attenuation; however, the use of valves further increases cost as well as having additional drawbacks. Current active and passive valve solutions used to address system resonances all suffer from one or more of noise, vibration, harshness (NVH) issues such as flutter, rattle, impact, and squeaking for example. Thus, solutions are needed to more effectively attenuate lower frequency noise without increasing cost and weight, and without introducing the aforementioned NVH issues.

SUMMARY OF THE INVENTION

In one exemplary embodiment, a valve assembly for a vehicle exhaust system includes at least one pipe enclosing an exhaust gas flow path, the pipe defining a central axis, and at least one flexible flap positioned within the exhaust gas flowpath. The at least one flexible flap has one fixed edge held fixed to the pipe and extends to a distal edge that is free to bend in response to an increase in exhaust gas flow pressure to provide a variable restriction to flow through the pipe that varies in response to a pressure difference upstream and downstream of the at least one flexible flap.

In a further embodiment of the above, the at least one flexible flap comprises a plurality of flexible flaps.

In a further embodiment of any of the above, each flexible flap comprises a thin metal sheet.

In a further embodiment of any of the above, a rigid bar is mounted within the exhaust gas flow path, the rigid bar having one end fixed to the pipe at a first location and an opposite end fixed to the pipe at a second location opposite from the first location, and wherein each flexible flap has one edge held fixed to the rigid bar and extends to the distal edge that is free to bend.

In a further embodiment of any of the above, the at least one flap includes at least one groove to define a deformation zone for bending of the flap.

In a further embodiment of any of the above, the at least one flap includes a tab extending outwardly from the one edge, and wherein the tab is fixed to the rigid bar or pipe such that a remaining portion of the one edge is free from attachment to the bar or pipe.

In a further embodiment of any of the above, the pipe includes at least one stop positioned downstream of the flexible flap.

In a further embodiment of any of the above, the at least one flap is mounted at an angle that places the distal edge downstream of the fixed edge when in a minimum flow condition and wherein the distal end bends to increase an open area of the exhaust gas flow path when in a maximum flow condition.

In a further embodiment of any of the above, the at least one flap is mounted at an angle that places the distal edge upstream of the fixed edge when in a minimum flow condition and wherein the distal end bends to increase an open area of the exhaust gas flow path when in a maximum flow condition.

These and other features of the present invention can be best understood from the following specification and drawings, the following of which is a brief description.

DETAILED DESCRIPTION

Figure 1:
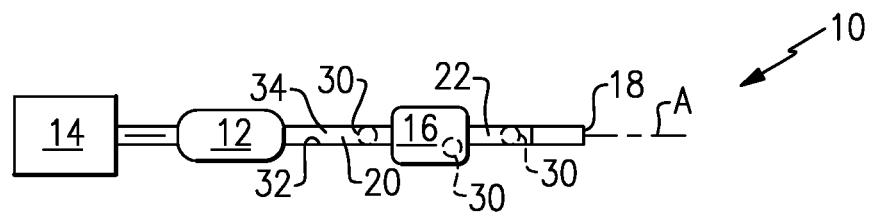
FIG. 1 shows a schematic view of a vehicle exhaust system with at least one variable restriction valve incorporating the subject invention.

As shown in FIG. 1, an exhaust system 10 includes a plurality of exhaust components 12 that convey hot exhaust gases from an engine 14 to other exhaust system components 16, such as catalysts, mufflers, resonators, etc., and eventually to the external atmosphere via a tailpipe 18. FIG. 1 represents a simplified system that includes at least an inlet pipe 20, a muffler component 16, and an outlet pipe 22. The exhaust system 10 includes one or more variable restriction valves 30 that can be mounted in any of various locations within the exhaust system 10. The variable restriction valves 30 operate to provide a simple and low-cost solution for reducing low frequency noise within the exhaust system 10.

In the example shown in FIG. 1, the variable restriction valve 30 is shown as being located within the inlet pipe 20; however, it should be understood that the valve 30 could be located within the muffler 16 or outlet pipe (see dashed lines in FIG. 1) instead of, or in addition to, the valve 30 being located within the inlet pipe 20. Further, the variable restriction valve 30 could also be located within other types of exhaust components that require additional noise attenuation. The inlet pipe 20 includes an inner surface 32 that defines an exhaust gas passage 34 that extends along an axis A. The valve 30 is positioned with the exhaust gas passage 34 to create a restriction in the flow to provide acoustic benefits especially at low frequencies and for standing waves in the inlet pipe 20. This restriction is not fixed and can change as a function of exhaust gas pressure drop across the valve.

In one example, the valve 30 comprises at least one flexible flap 36 that has one edge 38 held fixed to the pipe 20 and extends to a distal edge 40 that is free to bend away from a high pressure location towards a low pressure location. This results in a more open, i.e. less restrictive, exhaust gas passage 34 for the exhaust gas to flow through. This will provide a significantly higher back pressure than normal at low flow levels when the pressure drop is low enough such that the valve is mostly closed; however, as the pressure drop increases, the restriction will decrease such that the pressure drop (while still higher than at the low flow levels) is much lower than it would be for a fixed restriction. The amount of area that is open to flow when the valve is in the closed position can be adjusted as needed to provide the desired amount of back pressure at low flow rates.

Figure 2:
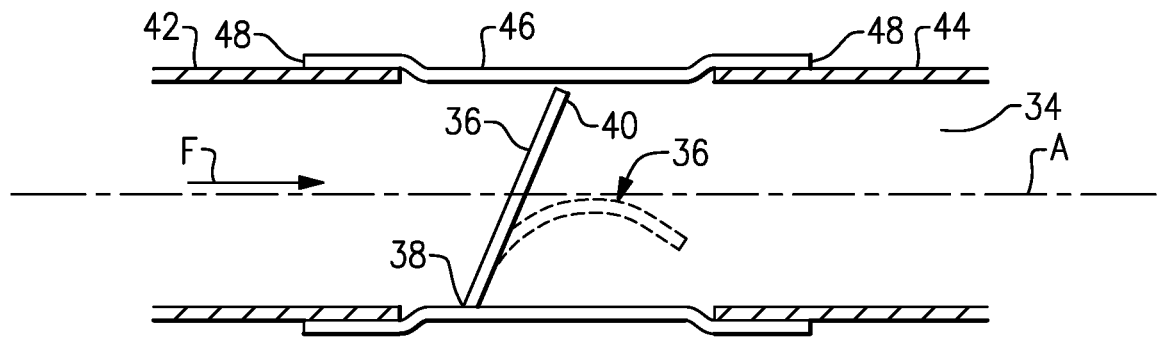
FIG. 2 shows one example of a variable restriction valve from the system of FIG. 1.

FIG. 2 shows one example of a flexible flap 36 that is configured to be mounted at any of the various locations described above. In this example, there is a first pipe 42 and a second pipe 44 that are connected to each other with a third pipe 46 such that all of the pipes 42, 44, 46 are coaxial along the axis A. The third pipe 46 has opposing ends 48 that have an inner diameter that is slightly greater than an outer diameter of the first 42 and second 44 pipes at the connection interfaces to the third pipe 46. The first 42 and second 44 pipes can then be easily fit into the third pipe 46 and the ends 48 can then be welded or brazed to provide a secure attachment interface. The reverse mounting configuration is also possible with the first 42 and second 44 pipes being inserted into the ends 48 of the third pipe 46 and then fixed thereto.

In this example, the flexible flap 36 has the one edge 38 held fixed to the third pipe 46 and extends across an entire cross-section of the third pipe 46 when in a no-flow or low flow condition. In one example, the flap 36 is positioned at an angle relative to the axis A such that the distal edge 40 is positioned further downstream relative to the direction of flow F than the fixed edge 38. When the pressure increases upstream of the flap 36, the flap 36 responds by bending to increase the amount of cross-sectional flow area, i.e. reducing the restriction, as shown in the dashed lines of FIG. 2. In one example, the flap 36 is comprised of a thin sheet of metal or other similar material that is capable of bending and returning to an unbent state when the pressure on the upstream side is reduced. The material must also be able to withstand high temperatures and corrosive conditions that exist within a vehicle exhaust system.

Figure 3:
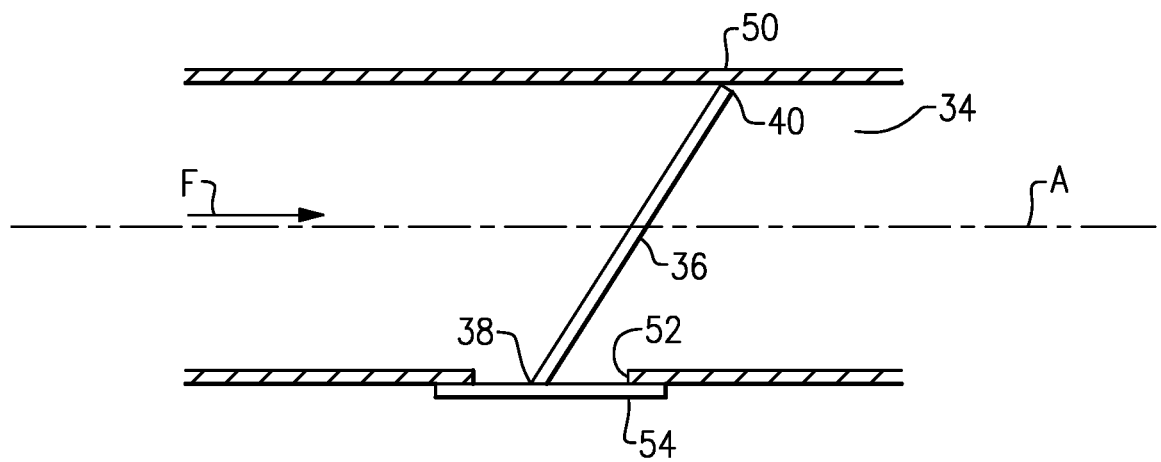
FIG. 3 shows another mounting configuration for the example of FIG. 2.

FIG. 3 shows an example that is similar to FIG. 2 but shows a different mounting configuration for the flap 36. In this example, there is a single pipe 50 that includes an opening 52. The one edge 38 of the flap 36 is fixed to a plate 54 or similar structure such that the flap 36 is inserted through the opening 52 and into the exhaust gas passage 34. The plate 54 is used to cover and seal the opening 52 once the plate 54 is fixed to the pipe 50. The flexible flap 36 extends across an entire cross-section of the pipe 50 when in the no flow or low flow condition, and operates in the same manner as discussed above.

Figure 4:
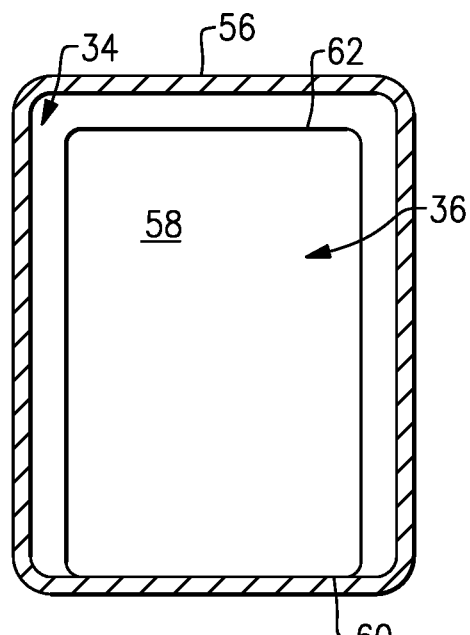
FIG. 4 shows another example embodiment.

FIG. 4 shows another example of a flexible flap 36. In this example, a pipe 56 has a polygonal shape and the flap 36 includes a flap body 58 have a polygonal shape that generally corresponds to a cross-sectional shape of the pipe 56. One edge 60 is fixed to the pipe 56 and a distal edge 62 extends across the exhaust gas passage 34 when in the no flow or low flow condition. The distal edge 62 bends in response to an upstream increase in pressure as described above. The body 58 can be inserted through an opening in the pipe 56 which would be closed by a cover as described above, or the edge 60 can be directly fixed to an inner surface of the pipe 56. In this example, the entire edge 60 of the body 58 is fixed to the pipe 56 by welding, brazing, or other attachment methods.

Figure 5:
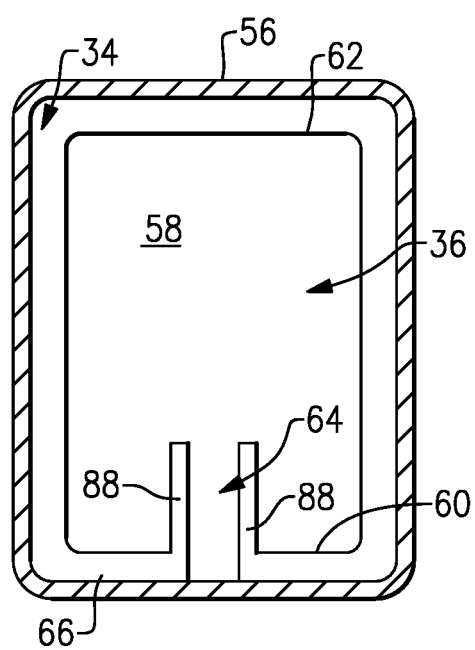
FIG. 5 shows another example embodiment.

FIG. 5 shows an example that is similar to FIG. 4 but instead of having the edge 60 directly connected to the pipe 56, a connecting tab 64 is used to connect the edge 60 of the body 58 to the pipe 56. In one example, the tab 64 is centrally located along the edge 60 and extends radially outwardly from the edge 60 to connect to the pipe 56 via welding, brazing, or other attachment methods. This leaves a gap 66 between a significant portion of the edge 60 and an inner surface of the pipe 56.

Figure 6:
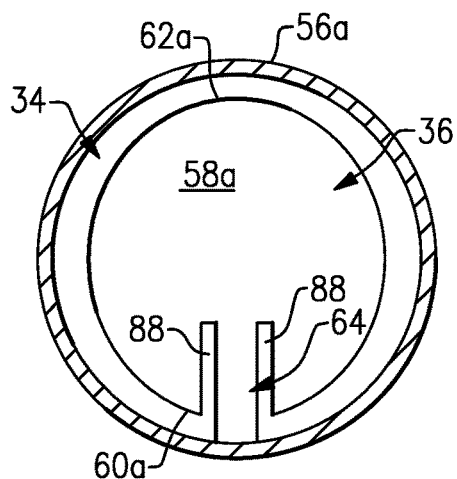
FIG. 6 shows another example embodiment.

FIG. 6 is an example that is similar to FIG. 5 but shows a different cross-sectional shape. In this example, a pipe 56a has a curved cross-section, such as a circular cross-section, and the flap 36 includes a flap body 58a that has a corresponding circular shape. The tab 64 connects a lower edge 60a of the body 58a to an inner surface of the pipe 56a in a manner as described above. A distal edge 62a of the body 58a bends in response to an upstream increase in pressure as described above.

Figure 7:
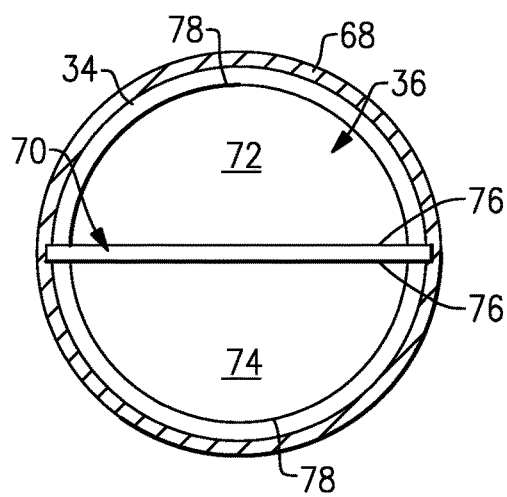
FIG. 7 shows another example embodiment.

FIG. 7 shows an example where the at least one flexible flap 36 comprises a plurality of flexible flaps. In this example, a pipe 68 includes a rigid mounting bar 70 that extends at least partially across the exhaust gas passage 34. In the example shown, the bar 70 extends across the entire section of the passage 34. At least a first flexible flap 72 and a second flexible flap 74 are mounted to the bar 70. Each flap 72, 74 includes a fixed edge 76 that is fixed to the bar 70 and distal edge 78 that extends that is bendable as described above. In this example, the entire fixed edge 76 of each flap 72, 74 is fixed to the bar 70. The fixed edges 76 can be welded, brazed, fastened, glued, etc. to the bar 70. FIG. 7 shows an example where the pipe 68 has a circular cross-section; however, the pipe 68 could also have an oval or polygonal cross-section with corresponding shaped flaps.

Figure 8:
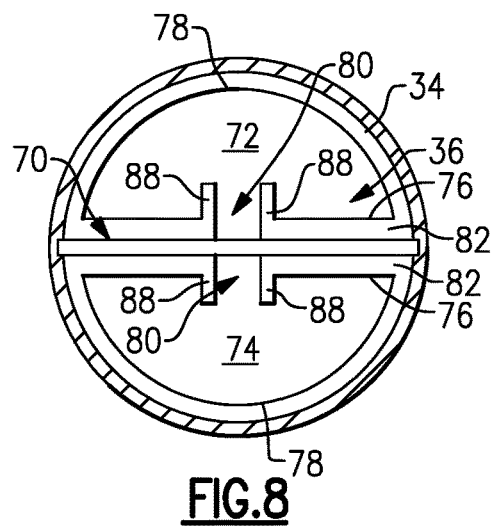
FIG. 8 shows another example embodiment.

FIG. 8 shows an example similar to FIG. 7 but instead of the entire edge 76 being fixed to the bar 70, a connecting tab 80 is used to connect the edge 76 to the bar 70 in manner that is similar to that shown in FIGS. 5 and 6. This leaves a gap 82 between the edge 76 of each flap 72, 74 and the bar 70.

Figure 9A:
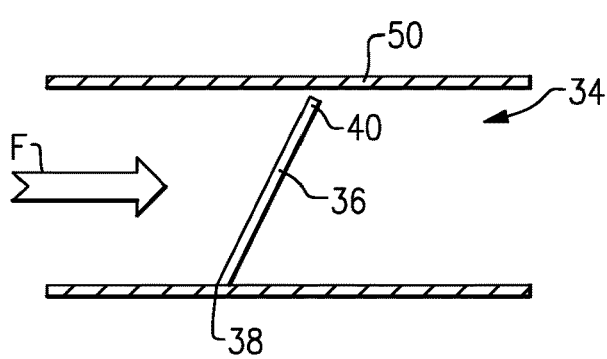
FIG. 9A shows another example embodiment in a high restriction condition.
Figure 9B:
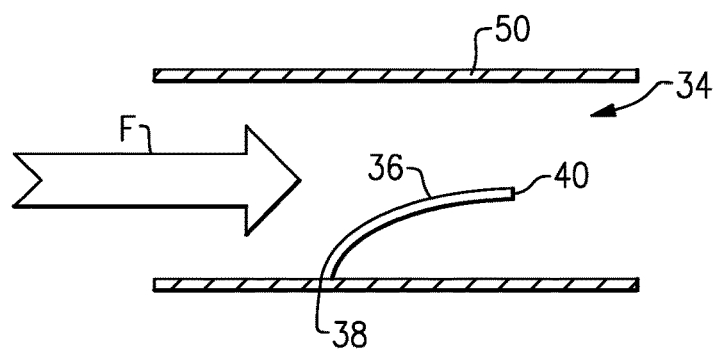
FIG. 9B shows the example of 9A in a low restriction condition.

FIGS. 9A-9B show an example similar to FIG. 3 but instead of using a cover plate 54, the edge 38 of the flap 36 is directly attached to the pipe 50. FIG. 9A shows a high restriction and low flow condition where the flap 36 is substantially unbent and FIG. 9B shows a low restriction and high flow condition where the flap 36 has bended.

Figure 10A:
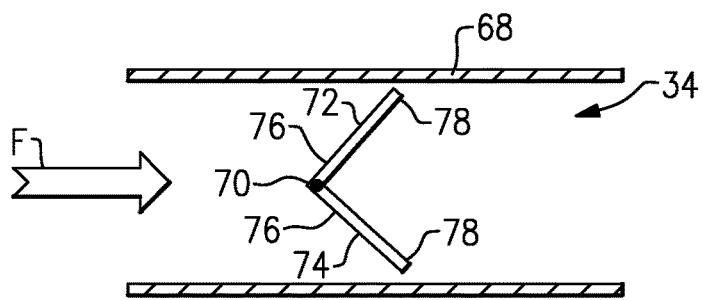
FIG. 10A shows another example embodiment in a high restriction condition.
Figure 10B:
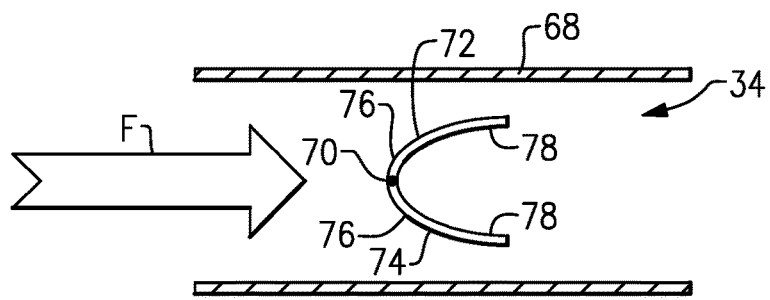
FIG. 10B shows the example of 9A in a low restriction condition.

FIGS. 10A-10B show a view similar to FIGS. 9A-9B but for a multiple flap example such as that shown in FIGS. 7 and 8. FIG. 10A shows a high restriction and low flow condition where the flap bodies 72, 74 are substantially unbent and FIG. 10B shows a low restriction and high flow condition where the flap bodies 72, 74 bend radially inwardly.

Figure 11:
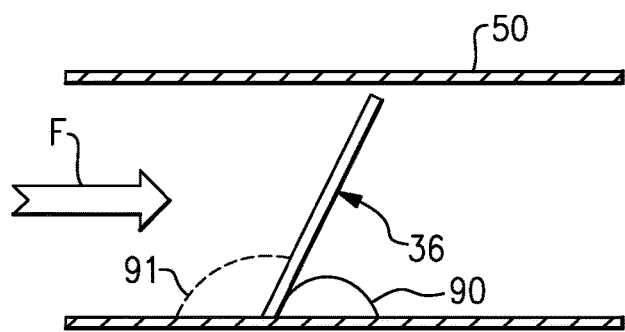
FIG. 11 shows another example embodiment.
Figure 12:
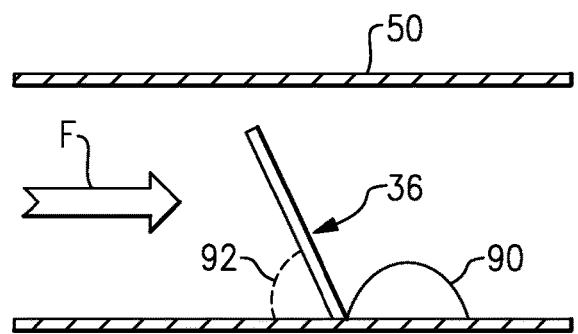
FIG. 12 shows another example embodiment.

FIG. 11 shows an example where the flap 36 is mounted at an angle 91 that places the free end downstream of the fixed end, or a pre-bend with the flow F. FIG. 12 shows an example where the flap 36 is mounted at an angle 92 that places the free end upstream of the fixed end, or a pre-bend against the flow F. As such, the response of the valve can be changed/varied as needed. FIG. 11 and FIG. 12 also show an optional example where a stop 90 is positioned downstream of the flap 36 to prevent against fatigue or other potential failure methods. The size and/or shape of the stop 90 can be varied as needed.

The tab connection configurations as described above are used to reduce the stiffness of the mounting interface of the flap(s) to the pipe to further control the variable restriction as needed.

In another example, to provide/define a preferred deformation shape/zone, grooves 88 (FIGS. 5, 6, and 8) can be cut into the flap(s) to further adjust stiffness of the valve.

In any of the various examples, a cross-section of the pipe that receives the flap(s) 36 can be circular, oval, or polygonal. Further, in each of the examples, the flexible flap(s) 36 comprise a thin metal sheet. All of a portion of the flow F must pass through the pipe for each of the described examples.

The subject valve 30 provides several advantages over traditional valves. The flap(s) create a restriction in the flow that provides acoustic benefits at low frequencies and for standing waves within the pipe. Further, the passive flap valve achieves a variable restriction in an exhaust pipe similar to a spring-loaded device; however, the stiffness comes from the flap itself. The stiffness can be tuned via the grooves 88 in the flap(s). The response of the valve can be tuned with the initial angle and bend of the flap(s). There are only deforming parts and no moving parts, which eliminates NVH issues that typically plague active and passive valves. The subject valve is also significantly lower in cost than current active and passive valve configurations due to the lower number of components.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve assembly for a vehicle exhaust system comprising:
at least one pipe enclosing an exhaust gas flow path, the pipe defining a central axis, and wherein the at least one pipe comprises an inlet pipe that is positioned upstream of a muffler or an outlet pipe that is positioned downstream of a muffler; and
at least one flexible flap positioned within the exhaust gas flowpath, wherein the at least one flexible flap has a fixed edge held fixed to the pipe and extends to a distal edge that is free to bend in response to an increase in exhaust gas flow pressure to provide a variable restriction to flow through the pipe that varies in response to a pressure difference upstream and downstream of the at least one flexible flap.

2. The valve assembly according to claim 1, wherein a cross-section of the pipe is circular, oval, or polygonal.

3. The valve assembly according to claim 1, wherein the at least one flexible flap comprises a thin metal sheet.

4. The valve assembly according to claim 1, wherein the at least one flexible flap comprises a plurality of flexible flaps.

5. The valve assembly according to claim 4, wherein each flexible flap comprises a thin metal sheet.

6. The valve assembly according to claim 4, including a rigid bar mounted within the exhaust gas flow path, the rigid bar having one end fixed to the pipe at a first location and an opposite end fixed to the pipe at a second location opposite from the first location, and wherein each flexible flap has one fixed edge held fixed to the rigid bar and extends to the distal edge that is free to bend.

7. The valve assembly according to claim 6, wherein each flap is mounted at an angle that places the distal edge downstream of the fixed edge when in a minimum flow condition and wherein the distal end bends to increase an open area of the exhaust gas flowpath when in a maximum flow condition.

8. The valve assembly according to claim 6, wherein each flexible flap includes a tab extending outwardly from the one edge, and wherein the tab is fixed to the rigid bar such that a remaining portion of the one edge is free from attachment to the rigid bar.

9. The valve assembly according to claim 6, wherein each flap includes at least one groove to define a deformation zone for bending of each flap.

10. The valve assembly according to claim 6, wherein each flap is mounted at an angle that places the distal edge upstream of the fixed edge when in a minimum flow condition, and wherein the distal end bends to increase an open area of the exhaust gas flowpath when in a maximum flow condition.

11. The valve assembly according to claim 1, wherein the at least one flap is mounted at an angle that places the distal edge downstream of the fixed edge when in a minimum flow condition and wherein the distal end bends to increase an open area of the exhaust gas flow path when in a maximum flow condition.

12. The valve assembly according to claim 1, wherein the at least one flap is mounted at an angle that places the distal edge upstream of the fixed edge when in a minimum flow condition and wherein the distal end bends to increase an open area of the exhaust gas flow path when in a maximum flow condition.

13. The valve assembly according to claim 1, wherein the at least one flap includes a tab extending outwardly from the one edge, and wherein the tab is fixed to the pipe such that a remaining portion of the one edge is free from attachment to the pipe.

14. The valve assembly according to claim 1, wherein the at least one flap includes at least one groove to define a deformation zone for bending of the flap.

15. The valve assembly according to claim 1, wherein the flap has a same cross-sectional shape as the pipe.

16. The valve assembly according to claim 1, wherein the at least one pipe comprises first and second pipes, and including a third pipe directly connecting the first pipe to the second pipe, wherein the at least one flexible flap has the one edge held fixed to the third pipe and extends across an entire cross-section of the third pipe when in a no flow or low flow condition.

17. The valve assembly according to claim 1, wherein the pipe includes at least one opening and including a plate that covers the opening, and wherein the at least one flexible flap has the one edge held fixed to the plate and extends across an entire cross-section of the pipe when in a no flow or low flow condition.

18. The valve assembly according to claim 1, wherein the pipe includes at least one stop positioned downstream of the flexible flap.

19. The valve assembly according to claim 1, wherein the at least one flexible flap is mounted at an obtuse angle relative to the central axis such that the distal edge is upstream or downstream of the fixed edge when in a minimum flow condition.

20. A valve assembly for a vehicle exhaust system comprising:
- at least one pipe enclosing an exhaust gas flow path, the at least one pipe defining a central axis and having an upstream end and a downstream end, wherein the at least one pipe comprises an inlet pipe that is positioned upstream of a muffler or an outlet pipe that is positioned downstream of a muffler; and
- at least one flexible flap positioned within the exhaust gas flowpath of the pipe at a location spaced from the upstream and downstream ends, wherein the at least one flexible flap has a fixed edge held fixed to the pipe and extends to a distal edge that is free to bend in response to an increase in exhaust gas flow pressure to provide a variable restriction to vary exhaust gas flow through the at least one pipe that varies in response to a pressure difference upstream and downstream of the at least one flexible flap.

21. The valve assembly according to claim 20, wherein the flap has a same cross-sectional shape as the at least one pipe.

22. The valve assembly according to claim 20, wherein the at least one flexible flap is mounted at an obtuse angle relative to the central axis such that the distal edge is upstream or downstream of the fixed edge when in a minimum flow condition.

\* \* \* \* \*

UNITED STATES PATENT AND TRADEMARK OFFICE
CERTIFICATE OF CORRECTION

| | |
|---|---|
| PATENT NO. | : 11,149,602 B2 |
| APPLICATION NO. | : 15/985901 |
| DATED | : October 19, 2021 |
| INVENTOR(S) | : Matthias Berger |

It is certified that error appears in the above-identified patent and that said Letters Patent is hereby corrected as shown below:

In the Claims

Claim 7, Column 6, Line 18; replace "the distal end" with --the distal edge--
Claim 8, Column 6, Line 24-25; replace "the one edge" with --the one fixed edge--
Claim 8, Column 6, Line 26; replace "a remaining portion of the one edge" with --a remaining edge portion--
Claim 10, Column 6, Line 32; replace "the distal end" with --the distal edge--
Claim 11, Column 6, Line 38; replace "the at least one flap" with --the at least one flexible flap--
Claim 11, Column 6, Line 38-39; replace "the distal end" with --the distal edge--
Claim 12, Column 6, Line 43-44; replace "the at least one flap" with --the at least one flexible flap--
Claim 12, Column 6, Line 44-45; replace "the distal end" with --the distal edge--
Claim 13, Column 6, Line 49-50; replace "the at least one flap" with --the at least one flexible flap--
Claim 13, Column 6, Line 50-51; replace "the one edge" with --the fixed edge--
Claim 13, Column 6, Line 52; replace "a remaining portion of the one edge" with --a remaining edge portion--
Claim 14, Column 6, Line 54-55; replace "the at least one flap" with --the at least one flexible flap--
Claim 14, Column 6, Line 56; replace "the flap" with --the at least one flexible flap--
Claim 15, Column 6, Line 57-58; replace "the flap" with --the at least one flexible flap--
Claim 16, Column 6, Line 62-63; replace "the one edge" with --the fixed edge--
Claim 17, Column 7, Line 2; replace "the one edge" with --the fixed edge--
Claim 21, Column 8, Line 12; replace "the flap" with --the at least one flexible flap--

Signed and Sealed this
Twenty-sixth Day of April, 2022

*Katherine Kelly Vidal*

Katherine Kelly Vidal
*Director of the United States Patent and Trademark Office*